United States Patent
Morliere et al.

(10) Patent No.: US 11,035,242 B2
(45) Date of Patent: Jun. 15, 2021

(54) SEALING ASSEMBLY FOR A TURBINE ROTOR OF A TURBOMACHINE AND A TURBINE OF A TURBOMACHINE COMPRISING SUCH AN ASSEMBLY

(71) Applicant: SAFRAN AIRCRAFT ENGINES, Paris (FR)

(72) Inventors: Simon Nicolas Morliere, Moissy-Cramayel (FR); Nicolas Jean-Marc Marcel Beauquin, Moissy-Cramayel (FR); Vincent Francois Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 104 days.

(21) Appl. No.: 16/514,027

(22) Filed: Jul. 17, 2019

(65) Prior Publication Data

US 2020/0063588 A1    Feb. 27, 2020

(30) Foreign Application Priority Data

Jul. 18, 2018 (FR) ...................................... 1856670

(51) Int. Cl.
*F01D 11/00* (2006.01)
*F01D 5/20* (2006.01)
*F02C 7/28* (2006.01)

(52) U.S. Cl.
CPC .............. *F01D 11/005* (2013.01); *F01D 5/20* (2013.01); *F01D 11/003* (2013.01); *F02C 7/28* (2013.01); *F05D 2240/11* (2013.01)

(58) Field of Classification Search
CPC . F02C 7/28; F01D 5/20; F01D 11/005; F01D 11/003; F16J 15/44
See application file for complete search history.

(56) References Cited

U.S. PATENT DOCUMENTS 8,998,573 B2 * 4/2015 Albers .................. F01D 25/246
                                                                415/173.3
9,988,934 B2 * 6/2018 Spangler ................. F01D 25/12
(Continued)

FOREIGN PATENT DOCUMENTS

FR        3 060 051 A1     6/2018
FR          3060051 A1 *   6/2018  ............ F01D 11/122
WO       2013/139837 A1    9/2013

OTHER PUBLICATIONS

English Translation FR 3060051 A1 (Year: 2017).*
Communication dated Apr. 25, 2019 from French Patent Office in counterpart FR Application No. 1856670.

*Primary Examiner* — Shafiq Mian
(74) *Attorney, Agent, or Firm* — Sughrue Mion, PLLC

(57) ABSTRACT

A sealing assembly for a turbine is provided. The turbine includes stages each including a nozzle blade extending between radially inner and outer platforms, the outer platform including a spoiler which delimits a groove. The assembly includes a ring, a tab, and an anti-wear foil. The ring is to be attached to an outer casing of the turbine. A part of the sealing tab is engaged in a first housing of a ring sector of the ring and another part in a second housing of an adjacent ring sector. The anti-wear foil, open upstream, is mounted in the groove. The downstream end of the ring sectors are to be engaged in the anti-wear foil. Each of the first and second housings is formed by a slot. The tab is bent and disposed in the slots so that a downstream end of the tab extends out of the slots.

10 Claims, 6 Drawing Sheets

(56) References Cited

U.S. PATENT DOCUMENTS

| | | | |
|---|---|---|---|
| 2013/0218924 A1* | 8/2013 | Kim | G06F 30/13 |
| | | | 707/770 |
| 2014/0241874 A1* | 8/2014 | Rioux | F01D 25/246 |
| | | | 415/209.4 |
| 2015/0001815 A1* | 1/2015 | Steiger | F01D 11/005 |
| | | | 277/649 |
| 2017/0218785 A1* | 8/2017 | Loiseau | F01D 25/246 |
| 2019/0218924 A1* | 7/2019 | Mulcaire | F23R 3/002 |

* cited by examiner

SEALING ASSEMBLY FOR A TURBINE ROTOR OF A TURBOMACHINE AND A TURBINE OF A TURBOMACHINE COMPRISING SUCH AN ASSEMBLY

GENERAL TECHNICAL FIELD

The present invention relates to a sealing assembly for a turbine rotor of a turbomachine and to a turbine of a turbomachine, in particular of an aircraft turbojet or turboprop engine, equipped with such a sealing assembly.

STATE OF THE ART

A turbomachine, particularly a twin-spool turbomachine, conventionally includes, from upstream to downstream, a fan, a low-pressure compressor, a high-pressure compressor, a combustion chamber, a high-pressure turbine and a low-pressure turbine.

The attached FIG. 1 shows an example of a turbine 1 for a turbomachine according to the state of the art.

This turbine comprises a plurality of successive stages each comprising a downstream nozzle 2 and an upstream impeller 3.

By convention, in the present application, the terms "upstream" AM and "downstream" AV are defined with respect to the direction of air flow in the turbine, that is to say from left to right in FIG. 1. Similarly, by convention in the present application, the terms "internal" and "external", and "inner" and "outer" and are defined radially with respect to the axis of the turbomachine.

Each nozzle 2 comprises a radially inner annular platform 21 and a radially outer annular platform 22 coaxial with each other, between which extend radial or substantially radial blades 23, evenly spaced apart over the entire circumference of said platforms.

The nozzle 2 is hooked radially outward, to an outer casing 4 of the turbine.

As it better appears in the attached FIG. 2 which represents the state of the art, the outer annular platform 22 comprises, at its upstream end, a radially outer flange 221 (or spoiler) and a radially inner flange (or spoiler) 222 which both extend upstream. These two flanges extend on either side of an annular groove 223 open toward the upstream AM.

The set of the nozzles 2 forms the fixed part of the engine called "stator".

Each impeller 3 comprises a disk 30 carrying, at its outer periphery, radial or substantially radial blades 31, the discs 30 of the different wheels being coaxially connected to each other and to a drive shaft by appropriate means so as to form the "rotor" of the turbine (see FIG. 1).

The impeller 3 rotates inside a sectorized ring 6 also hooked to the outer casing 4. This ring 6 is formed of a plurality of ring sectors 60, which extend circumferentially in an arc-of-circle, and which are arranged circumferentially end-to-end.

The ring sectors 60 each carry internally a block of abradable material 61. These abradable material blocks are capable of cooperating with friction with annular wipers 32 (seal tongues) disposed at the radially outer periphery of each blade 31 of the rotor. Each ring sector 60 comprises, at its downstream end, an annular groove sector open radially toward the outside. When the different ring sectors 60 are assembled, the groove portions of each ring sector together form an annular groove 62, in which a downstream annular rail 40 of the outer casing 4 is engaged, acting as a hook and thus ensuring the attachment of the ring 6 on the outer casing 4.

The downstream annular rail 40 and the downstream ends of the different ring sectors 60 are maintained in a radial direction (i.e. from bottom to top and from top to bottom in FIG. 2) by the inner 222 and outer 221 flanges (spoilers) of the outer platform 22.

Furthermore, each ring sector 60 comprises, at its upstream end, a circumferential member 63 with a C-shaped cross-section, which is engaged axially from downstream on an upstream annular rail 41 of the external casing 4.

Furthermore, in order to ensure sealing between the different ring sectors 60 and to limit the hot gas leakage to the outside of the flow path, at least one sealing member 64 (such as a plate or a sealing tab) extends between the circumferential ends of the different ring sectors 60.

More specifically, a substantially rectangular planar sealing plate 64 is mounted, for a part, in a housing 65 of a circumferential edge of a ring sector and, for another part, in a housing 65 of a circumferential edge of an adjacent ring sector 60, located oppositely. The plate 64 thus overlaps the inter-sector space between two adjacent ring sectors 60.

There are still possibilities of air leakage between two neighboring ring sectors 60.

Furthermore, the different ring sectors 60 are successively assembled by a tilting mounting with respect to each other, which temporarily causes a too significant difference in position between the two housings 65 (slits) located facing each other, to allow the mounting of the sealing plates 64 before all the ring sectors 60 have been assembled together.

PRESENTATION OF THE INVENTION

The invention therefore aims at improving sealing between the different sectors of a rotor ring while allowing an easy mounting of the sealing members, once said ring sectors are all mounted on the external casing of the turbomachine.

Another object of the invention is to ensure a good maintenance of said sealing members during operation of the turbine, as well as an easy dismounting of these members.

To this end, the invention relates to a sealing assembly for a turbine rotor of a turbomachine, said turbine comprising a fixed outer casing and a plurality of stages each comprising an upstream rotor impeller and a downstream nozzle, said nozzle comprising at least one blade extending between a radially inner platform and a radially outer platform, the radially outer platform comprising a spoiler at its upstream end which delimits, with the radially outer platform, an annular groove open toward the upstream, the sealing assembly comprising a sealing ring configured to be attached to the outer casing, the impeller being adapted to be driven in rotation inside the sealing ring, the sealing ring comprising a plurality of ring sectors, which extend circumferentially about its longitudinal axis by being adjacent in the circumferential direction, a sealing tab being engaged, for a part, in a first housing of a ring sector and, for another part, in a second housing of an adjacent ring sector, said first housing and said second housing opening opposite each other and toward the downstream through a downstream mouth and an anti-wear foil trunking-shaped, open toward the upstream being mounted in said groove.

According to the invention, the downstream end of the ring sectors is configured to be engaged in said anti-wear foil, each of the first and second housings is formed by a slot comprising a radially outer wall and a radially inner wall which extend axially and the sealing tab is bent at its downstream end and is disposed in the slots located oppositely, so that its downstream end extends out of the slots and is disposed facing the anti-wear foil.

Thanks to these characteristics of the invention, air flowing in the flow path of the turbine and hitting the bent downstream end of the sealing tab after having passed between two neighboring sectors of the sealing ring, is redirected toward the inside of the flow path and can no longer escape toward the outside and toward the downstream.

Preferably, the radially inner wall of each slot extends at the downstream mouth of said slot by an inclined part which tapers from said slot toward the longitudinal axis of the sealing ring, each slot being thus configured so that the sealing tab can be inserted therein by axial insertion from downstream and so that, when it is inserted therein, the radially inner face of its downstream end is in contact with said inclined part. The specific shape of the slot for receiving said sealing tab and in particular its wide mouth, makes it possible to have easy access to the downstream end of said tab. This also makes it possible to remove it more easily when it is desired to dismount the different ring sectors, for example during maintenance operations of the turbine.

According to other advantageous and non-limiting characteristics of the invention, taken alone or in combination:
the radially outer wall of each slot extends at the downstream mouth of said slot by a part inclined toward the longitudinal axis of the sealing ring, so as to limit the axial displacement of the sealing tab toward the downstream;
the sealing assembly comprises a nozzle disposed downstream of the sealing ring, the nozzle comprising at least one blade extending between a radially inner platform and a radially outer platform, the radially outer platform comprising a spoiler at its upstream end which delimits, with the radially outer platform, an annular groove open toward the upstream, the anti-wear foil, trunking-shaped open toward the upstream, being mounted in said groove of the nozzle, and the downstream end of the ring sectors being engaged in said anti-wear foil so that the downstream end of the sealing tab is facing the anti-wear foil, in that the anti-wear foil comprises a bottom, a radially outer wall and a radially inner wall and this foil is positioned in said annular groove so that its radially outer wall is in contact with the radially internal face of the spoiler and so that its radially inner wall is in contact with the radially external face of the upstream flange of the radially outer platform;
the anti-wear foil has a curved radially outer end which extends facing the upstream face of the radially outer spoiler;
the anti-wear foil has a curved radially inner end which extends facing the upstream face of the radially outer spoiler of the radially outer platform;
the edge of the downstream end of the sealing tab is curved toward the outside with respect to the longitudinal axis of the sealing ring;
the edge of the downstream end of the sealing tab is in contact with the bottom and the radially inner wall of said anti-wear foil;
the ring sectors each comprise, at their downstream end, a groove open radially toward the outside, which is configured to receive a hook of the outer casing.

The invention also relates to a turbine of a turbomachine, in particular of an aircraft turbojet or turboprop engine, comprising a fixed outer casing and a plurality of stages each comprising an upstream rotor impeller and a downstream nozzle, said nozzle comprising at least one blade extending between a radially inner platform and a radially outer platform, the radially outer platform comprising a spoiler at its upstream end which delimits, with the radially outer platform, an annular groove open toward the upstream, this turbine comprising a sealing assembly as mentioned above.

PRESENTATION OF THE FIGURES

Other characteristics and advantages of the invention will appear from the description which will now be made with reference to the appended drawings that represent, as an indication and without limitation, different possible embodiments.

DETAILED DESCRIPTION OF THE INVENTION

The turbine, according to the invention, will now be described in more detail with reference in particular to FIGS. 3 to 7.

Figure 1:
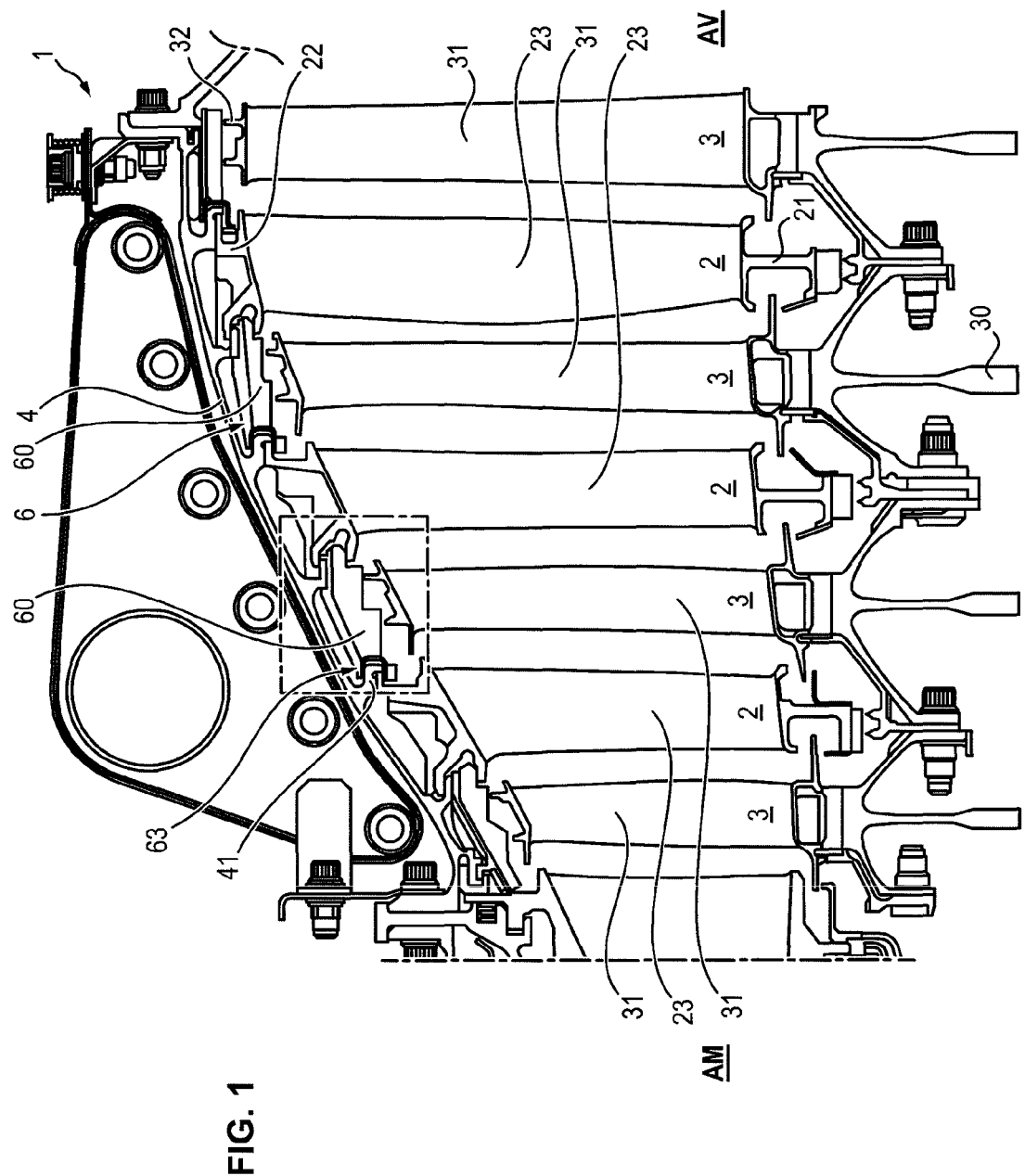
FIG. 1 is a cross-sectional view of a low-pressure turbine according to the state of the art.
Figure 2:
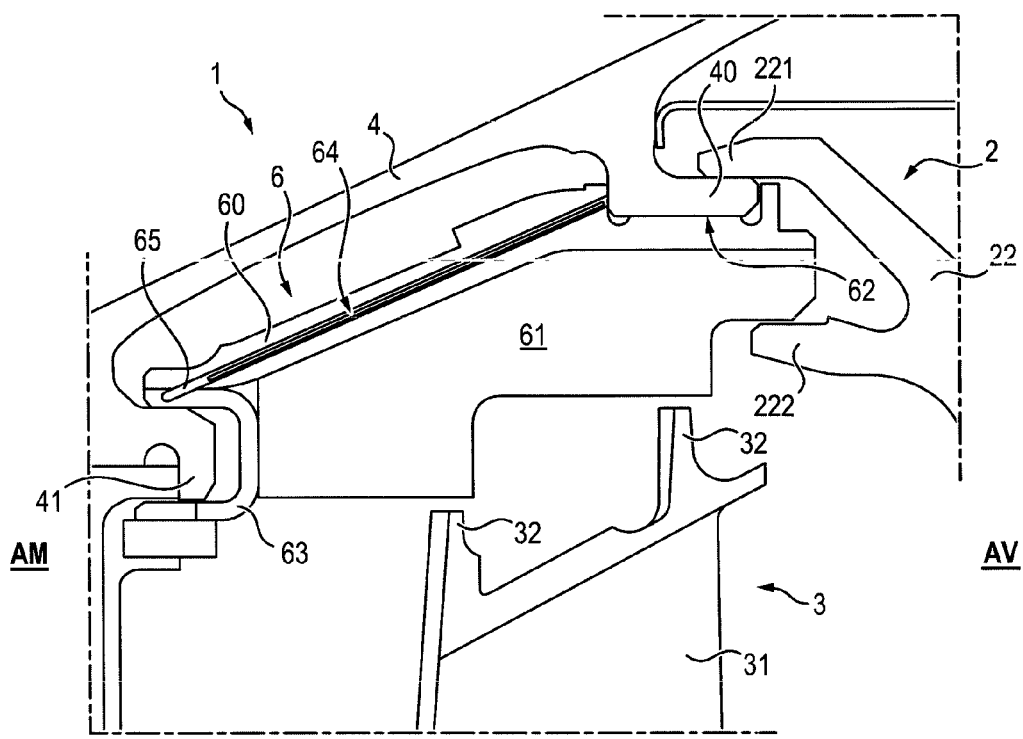
FIG. 2 is a detailed view of a part of the turbine of FIG. 1.

The elements that are identical to those of the turbine previously described in relation to FIGS. 1 and 2 will not be described again and have the same reference numerals.

The turbine according to the invention differs in particular from the previous one in its ring inter-sector sealing assembly.

This sealing assembly comprises a sealing ring 7, a plurality of sealing tabs 8.

The impeller 3 rotates inside the sealing ring referenced 7. This ring which extends around the impeller 3 is attached to an outer casing 4 of the turbine. It is formed of a plurality of ring sectors, adjacent in the circumferential direction and arranged end-to-end, each being attached to the outer casing 4 of the turbine.

Figure 4:
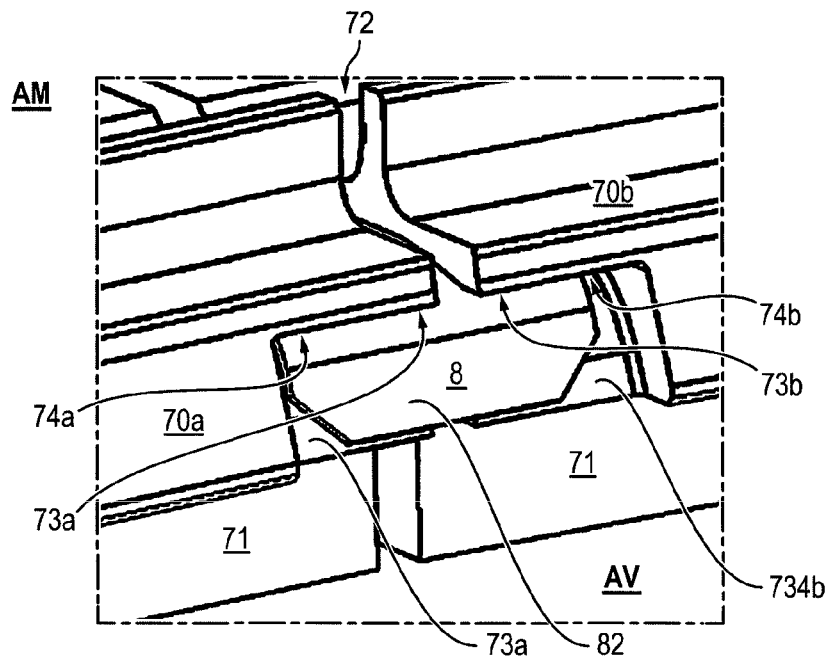
FIG. 4 is a perspective view of the downstream ends of two neighboring ring sectors of the rotor and of the sealing tab, according to the invention.

In FIG. 4, two adjacent ring sectors, here referenced 70a, 70b, can thus be seen.

Each ring sector includes a block of abradable material 71, capable of cooperating with the wipers 32 of the blades 31 of the facing rotor.

Each ring sector 70a, 70b comprises at its downstream end, an annular groove portion 72 open radially toward the outside. When the different ring sectors 70a, 70b are assembled, these groove portions define together an annular groove 72, in which the downstream annular rail 40 of the outer casing 4 is engaged, so as to ensure the attachment thereon.

Figure 6:
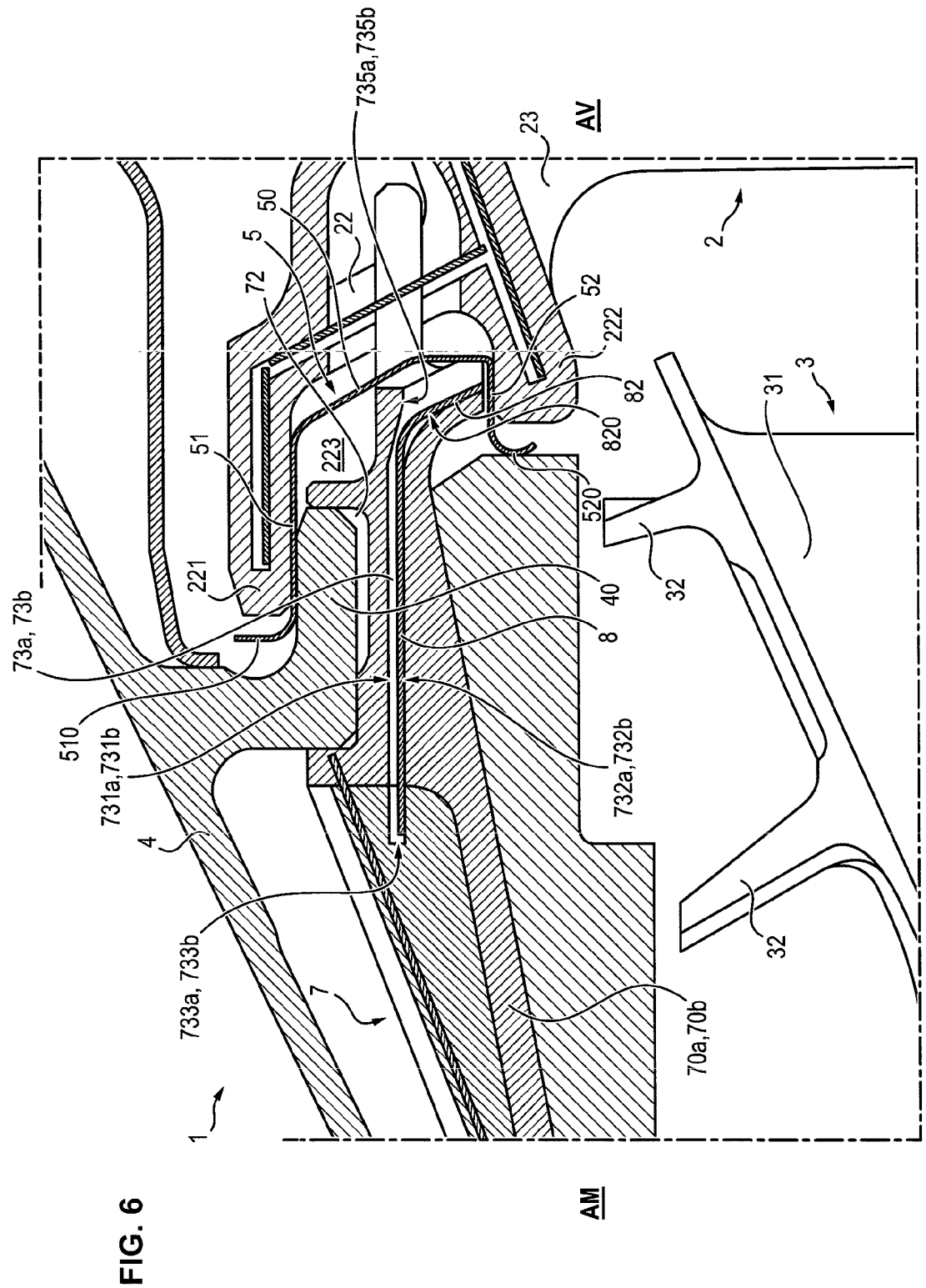
FIG. 6 is a detailed view representing a first variant of the sealing tab according to the invention.

Although this is not visible in FIG. 6, each ring sector 70, 70a, 70b is also attached to its upstream part on the upstream rail 41 of the casing 4, by a circumferential member with a C-shaped cross-section, similar to the one previously described for the embodiment of FIG. 2.

In order to ensure inter-sector sealing, a sealing member 8, 8' is engaged, for a part, in a first housing 73a of the ring sector 70a and, for another part, in a second housing 73b of the adjacent ring sector 70b, by thus overlapping the inter-sector space existing between these two adjacent ring sectors.

Said first housing 73a and said second housing 73b open on the circumferential faces of their respective ring sectors 70a and 70b and each of them also opens toward the downstream of the turbine. The housings 73a, 73b are opposite each other when the two sectors 70a and 70b are assembled.

Each housing 73a, 73b is arranged in the downstream part of the ring sector 70a, respectively 70b, and below the groove sector 72.

Preferably, each housing 73a, 73b is shaped as a slot.

Figure 7:
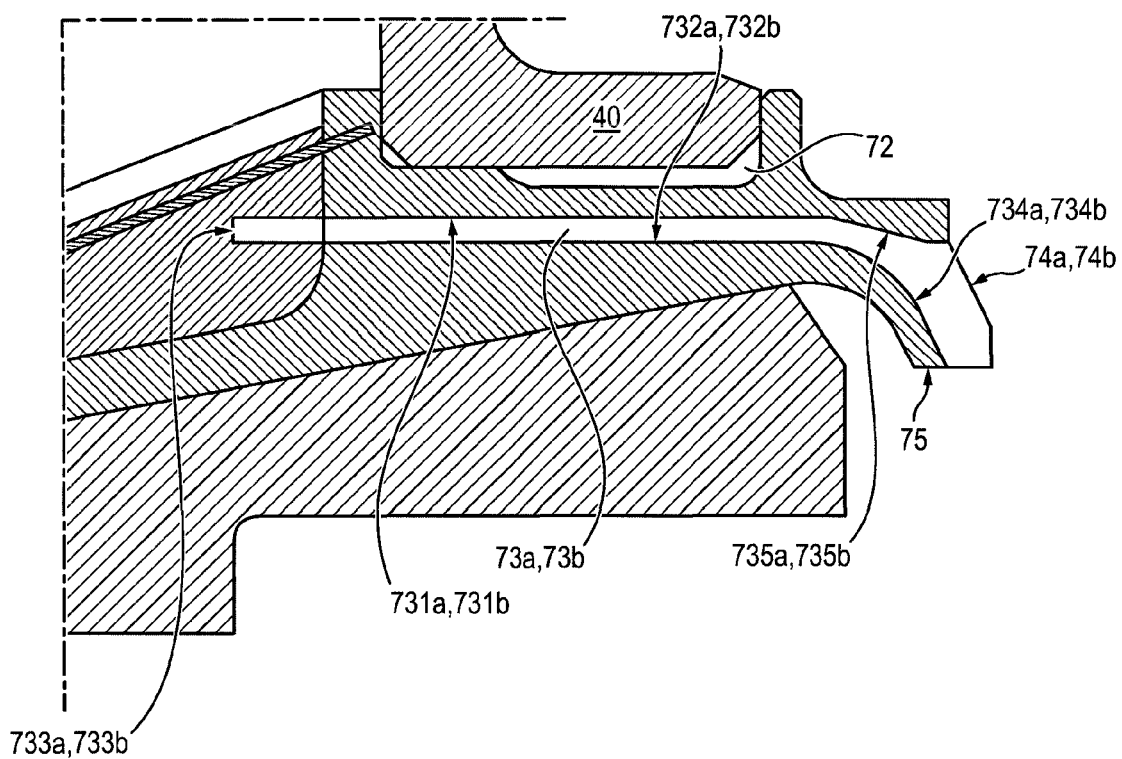
FIG. 7 is a detailed view of a rotor ring sector according to the invention.

As can be seen in FIG. 7, this slot 73a, respectively 73b includes a radially outer wall 731a, respectively 731b and a radially inner wall 732a, respectively 732b, extending axially (that is to say according to the axis of the turbine) or substantially axially. They are connected together by a bottom wall 733a, respectively 733b extending radially.

Each bottom wall 733a, 733b extends opposite to the mouth 74a, respectively 74b of the slots 70a, 70b.

The radially inner wall 732a, respectively 732b, extends toward the downstream mouth 74a, 74b by an inclined part 734a, respectively 734b which tapers from said slot, toward the longitudinal axis of the sealing ring 7, that is to say toward the inside of the turbine (toward the bottom of FIG. 7).

Preferably, the radially outer wall 731a, 731b extends at the downstream mouth 74a, 74b by a part 735a, 735b slightly inclined toward the longitudinal axis of the sealing ring 7.

As can be seen in FIG. 6, the anti-wear foil 5 is mounted in the groove 223 of the nozzle 2. It is trunking-shaped (shaped as a chute), open toward the upstream. It is either annular or composed of a plurality of ring sectors. The foil 5 is made of a thin sheet, for example comprised between 0.1 mm and 1 mm of thickness, which gives it certain elasticity. Preferably, it is manufactured in an alloy that is particularly resistant to wear and to thermal stresses, such as a cobalt and nickel based alloy.

As can be seen in FIG. 6, the trunking-shaped foil 5 comprises a bottom 50, a radially outer wall 51 and a radially inner wall 52.

This foil 5 is disposed in the groove 223 so that its radially outer wall 51 is in contact with the radially internal face of the outer spoiler 221 and so that its radially inner wall 52 is in contact with the radially external face of the inner spoiler 222 of the radially outer platform 22. Its elasticity allows it to remain maintained therein.

Advantageously, it should also be noted that the foil 5 has a radially outer end 510 curved toward the outside of the turbine, so that it extends in front of the upstream face of the radially outer spoiler 221 of the outer platform 22.

Also preferably, the foil 5 has a radially inner end 520 curved toward the inside of the turbine and which extends facing the upstream face of the radially inner spoiler 222 of the outer platform 22 of the nozzle 2.

The ends 510, 520 ensure the axial blockage of the foil.

The role that the foil 5 plays in the sealing will be explained later.

Furthermore, according to a first embodiment of the invention represented in FIGS. 3 to 5 and 8, the sealing member 8 has the shape of a substantially rectangular tab bent at its downstream end.

The sealing tab 8 is advantageously made of a thin metal sheet, (for example of a thickness comprised between 0.1 mm and 1 mm) so that it has a certain elasticity. The material chosen is also resistant to wear and to thermal stresses, it is possible to use, for example, a nickel or cobalt based alloy. It has a main part 81 and a downstream end 82 joined by a bent part 83.

Figure 3:
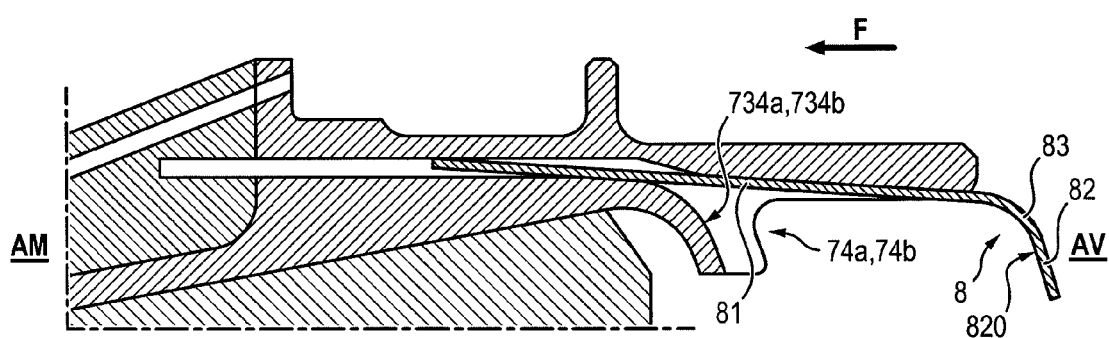
FIG. 3 is a schematic view representing the introduction of a sealing tab according to the invention inside a ring sector, also according to the invention.

This sealing tab 8 is inserted inside the two housings (slots) 73a, 73b located opposite each other, as represented in the diagram of FIG. 3. This introduction is made from downstream AV to upstream AM according to the direction of motion represented by the arrow F.

Figure 5:
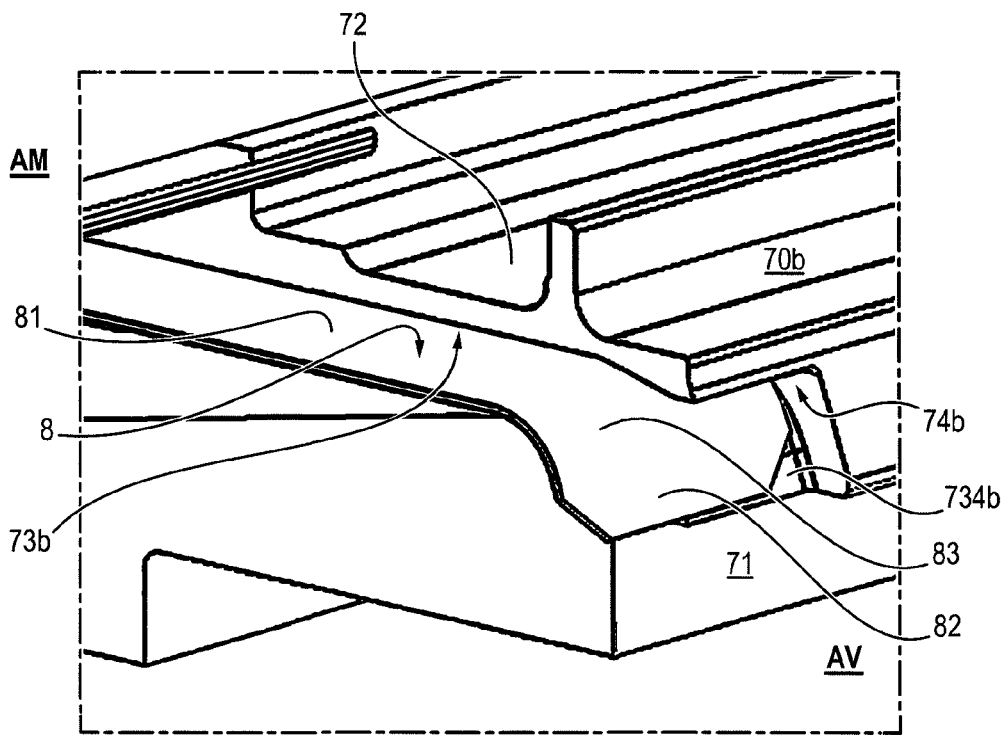
FIG. 5 is a view similar to that of FIG. 4 but in which one of the ring sectors has been removed.

When the tab 8 is completely inserted into the slots (as represented in FIGS. 4 to 6), then the radially inner face 820 of its downstream end 82 is in contact with the respective inclined parts 734a and 734b of the housings 73a, respectively 73b.

It should be noted that the part 735a, 735b of the radially outer wall, due to its shape slightly inclined toward the inside, tends to retain the tab 8 once it is in place and to prevent its axial displacement toward the downstream AV of the turbine.

To this end, it should be noted that the angle of inclination of the end 82 with respect to the part 81 of the tab 8 is the same as the angle of inclination of the inclined parts 734a, 734b with respect to the radially inner walls 732a, 732b.

In addition, as can be seen in FIG. 6, the downstream end of the ring sectors 70a, 70b is engaged in the concave part of the foil 5. In this position, the downstream annular rail 40 rests against the radially internal face of the radially outer wall 51 of the foil 5 while the radially internal face 75 (see FIG. 7) of the downstream end of the ring sectors 70a, 70b is disposed facing the radially outer face of the radially inner wall 52 of the foil 5.

According to another embodiment not represented in the figures, the radially internal face 75 of the ring sectors 70a, 70b rests directly against the radially outer face of the radially inner wall 52 of the foil 5.

When the sealing tab 8 is in place, the air flowing in the flow path of the turbine can no longer exit at the mouth 74a, 74b and is folded back toward the inside of the flow path through the downstream end 82 of said sealing tab.

In addition, the curved downstream end 82 is facing the bottom 50 of the foil 5 which then constitutes a second sealing barrier since the air cannot flow between the downstream end of the sealing ring 7 and the groove 223 of the nozzle 2.

Figure 8:
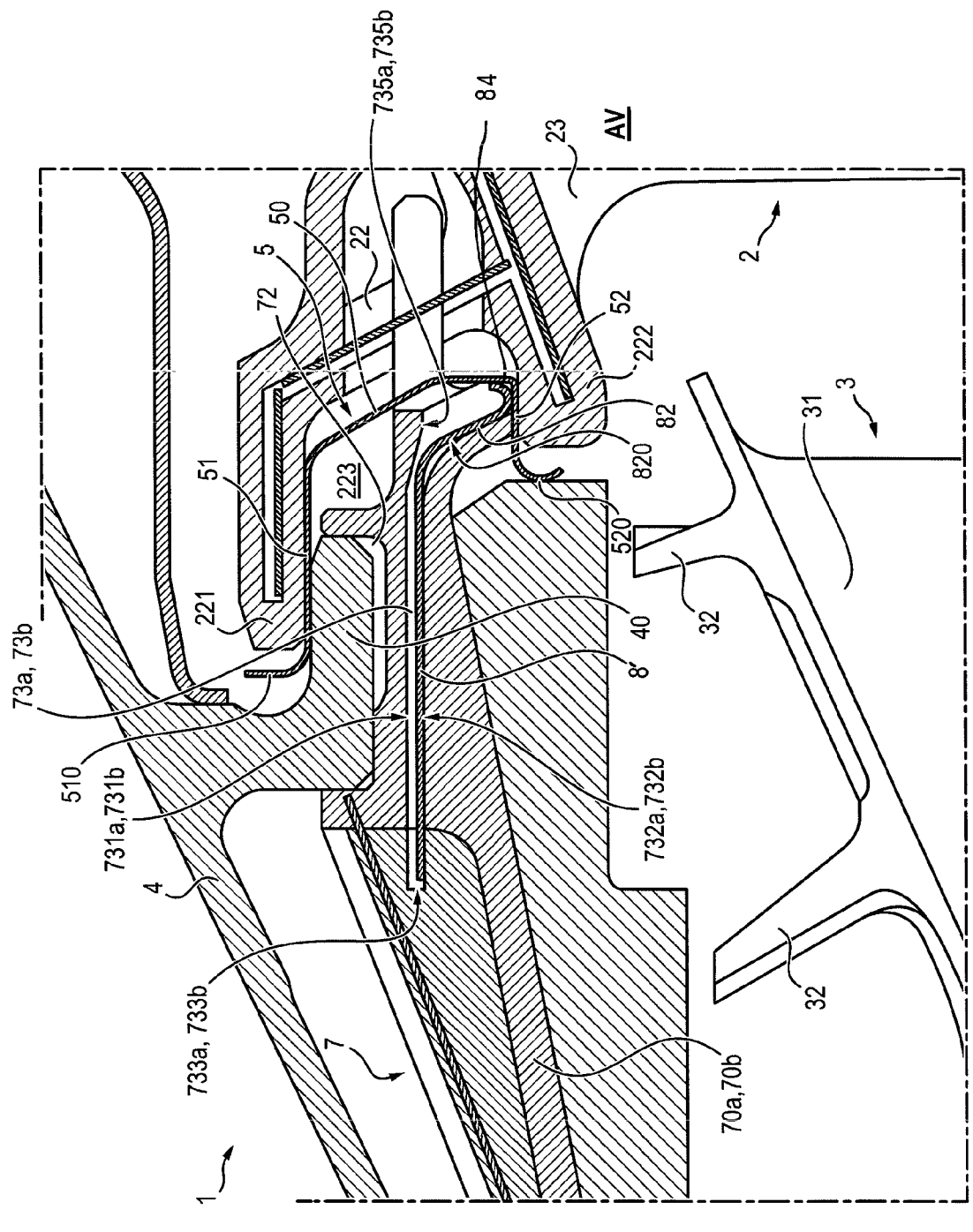
FIG. 8 is a detailed view representing a second variant of the sealing tab according to the invention.

According to a second embodiment of the invention, represented in FIG. 8, the edge 84 of the downstream end 82 of the sealing strip is curved toward the outside (that is to say toward the outside of the turbine when the tab is in the slot 73a, 73b). The ring 7 and the foil 5 remain identical.

This sealing tab is then referenced 8'.

Thus, when the downstream end of the ring sectors 70a, 70b and the rail 40 of the outer casing 4 are inserted in the concave part of the foil 5 disposed in the housing 223 of the radially outer platform 22 of the nozzle 2, then the edge 84 comes into contact with the bottom 50 and the radially inner wall 52 of the foil 5. This further strengthens the axial blockage of the sealing tab 8' and the overall sealing of the sealing assembly according to the invention through the direct contact between the edge 84 and the foil 5.

The invention claimed is:

1. A sealing assembly for a turbine rotor of a turbine of a turbomachine, said turbine comprising a fixed outer casing and a plurality of stages each comprising an upstream rotor impeller and a downstream nozzle, said downstream nozzle comprising at least one blade extending between a radially inner platform and a radially outer platform, the radially outer platform comprising a spoiler at its upstream end of the radially outer platform which delimits, with the remaining part of the radially outer platform, an annular groove open toward an upstream end, the sealing assembly comprising:

a sealing ring configured to be attached to the fixed outer casing, the upstream rotor impeller being adapted to be driven in rotation inside the sealing ring, the sealing ring comprising a plurality of ring sectors which extend circumferentially about its longitudinal axis and adjacent to the circumferential direction, a sealing tab being engaged, for a part, in a first housing of a ring sector and, for another part, in a second housing of an adjacent ring sector, said first housing and said second housing opening opposite each other and toward downstream through a downstream mouth, and a trunk-shaped anti-wear foil opens toward the upstream, and mounted in the annular groove, wherein the downstream end of the plurality of ring sectors is configured to be engaged in said anti-wear foil, in that each of the first and second housings is formed by a slot comprising a radially outer wall and a radially inner wall which extend axially and in that the sealing tab is bent at its downstream end and is disposed in the slots located oppositely, so that its downstream end extends out of the slots to be able to face the anti-wear foil.

2. The sealing assembly according to claim 1, wherein the radially inner wall of each slot extends at the downstream mouth of said slot by an inclined part which tapers from said slot toward the longitudinal axis of the sealing ring, each of said slot being thus configured so that the sealing tab may be inserted therein by axial insertion from downstream so that when the sealing tab is inserted therein, the radially inner face of its downstream end is in contact with said inclined part.

3. The sealing assembly according to claim 1, wherein the radially outer wall of each slot extends at the downstream mouth of said slot by a part inclined toward the longitudinal axis of the sealing ring, so as to limit the axial displacement of the sealing tab toward the downstream.

4. The sealing assembly according to claim 1, further comprising a nozzle disposed downstream of the sealing ring, the nozzle comprising at least one blade extending between a radially inner platform and a radially outer platform, the radially outer platform comprising a spoiler at the upstream end of the radially outer platform, which delimits, with the remaining part of the radially outer platform, an annular groove open toward the upstream, the trunk-shaped anti-wear foil opens toward the upstream, being mounted in said groove of the nozzle, and the downstream end of the ring sectors being engaged in said anti-wear foil so that the downstream end of the sealing tab faces the anti-wear foil, in that the anti-wear foil comprises a bottom, a radially outer wall and a radially inner wall and in that the anti-wear foil is positioned in said annular groove so that its radially outer wall is in contact with the radially internal face of the spoiler and so that its radially inner wall is in contact with the radially external face of the upstream flange of the radially outer platform.

5. The sealing assembly according to claim 4, wherein the anti-wear foil has a curved radially outer end which extends facing the upstream face of the radially outer spoiler.

6. The sealing assembly according to claim 4, wherein the anti-wear foil has a curved radially inner end which extends facing the upstream face of the radially outer spoiler of the radially outer platform.

7. The sealing assembly according to claim 1, wherein the edge of the downstream end of the sealing tab is curved toward the outside with respect to the longitudinal axis of the sealing ring.

8. The sealing assembly according to claim 4, wherein the edge of the downstream end of the sealing tab is in contact with the bottom and the radially inner wall of said anti-wear foil.

9. The sealing assembly according to claim 1, wherein the each of the plurality of the ring sectors comprise, at their downstream end, a groove open radially toward the outside, which is configured to receive a hook of the outer casing.

10. A turbine of a turbomachine of an aircraft turbojet or turboprop engine, the turbine comprising a fixed outer casing and a plurality of stages each comprising an upstream rotor impeller and a downstream nozzle, said downstream nozzle comprising at least one blade extending between a radially inner platform and a radially outer platform, the radially outer platform comprising a spoiler at upstream end of the radially outer platform which delimits, with the remaining part of the radially outer platform, an annular groove open toward the upstream, wherein the turbine comprises a sealing assembly according to claim 1.

* * * * *